United States Patent [19]
Masuda et al.

[11] Patent Number: 5,676,023
[45] Date of Patent: Oct. 14, 1997

[54] CANE TYPE EMERGENCY BRAKE

[75] Inventors: Satoru Masuda; Tadahiro Shoji; Kazuhito Ishiyama, all of Yokohama, Japan

[73] Assignee: Otsuka Koki Kabushiki Kaisha, Yokohama, Japan

[21] Appl. No.: 568,519

[22] Filed: Dec. 7, 1995

[30] Foreign Application Priority Data

Aug. 31, 1995 [JP] Japan .................... 7-223650

[51] Int. Cl.⁶ .................................................. G05G 5/06
[52] U.S. Cl. ...................... 74/538; 74/503; 74/543; 74/536; 74/545; 74/475; 74/473 R; 74/110
[58] Field of Search ............. 74/557, 528, 538, 74/543, 567, 569

[56] References Cited

FOREIGN PATENT DOCUMENTS

| | | |
|---|---|---|
| 63-24074 | 2/1988 | Japan . |
| 63-24075 | 2/1988 | Japan . |
| 7-186912 | 7/1995 | Japan . |

*Primary Examiner*—Vinh T. Luong
*Attorney, Agent, or Firm*—Armstrong, Westerman, Hattori, McLeland & Naughton

[57] ABSTRACT

A cane type emergency brake of an automobile having a handle which can turn freely over 180 degrees, and which is of durable function. The cane type emergency brake includes a stem (10) which can be held in a state of pulling a brake cable, a handle (20) combined free-rotatably to the stem (10), a return mechanism (30) for returning the handle (20) to an initial position, and a free turn stopper (40) for disabling the free turning of the handle (20). The return mechanism (30) includes a cam plate (31) and a cam (33). The cam plate (31) is pressed to the periphery of the cam (33). The cam (33) is formed monolithically on the enlarged top (15) of the stem (10) and slides the cam plate (31) against the force that presses the cam plate (31) to the periphery of the cam (33). When the handle (20) is in the initial position, the contact position where the cam (33) and the cam plate (31) are contacted with each other is shifted from the center line of the stem (10) to the direction of the force. A sleeve (28) is fixed to the contact portion (27) which contacts the handle (20) to the stem (10).

1 Claim, 7 Drawing Sheets

Fig. 5 middle step of the turn of the cam

Fig. 6 middle step of the turn of the cam

CANE TYPE EMERGENCY BRAKE

BACKGROUND OF THE INVENTION

1. Field of the Invention

This invention relates to a cane type emergency brake of an automobile and more particularly to a cane type emergency brake which is released by two step operations in order to prevent careless release of the brake.

2. Description of the Prior Art

In general, a conventional cane type emergency brake comprises a stem for pulling a brake cable and a guide tube for guiding a rectilineal motion of the stem, and teeth are formed on a part of upper face of the stem along its axial direction, on the other hand, a nonreturn pawl which can be engaged with said teeth of the stem is formed on the inside of the guide tube; therefore, in braking operation, the stem can be held in given position by engagement of teeth of the stem and nonreturn pawl.

If a handle of the stem is pulled against the tension of the brake cable to loosen the engagement of the teeth and nonreturn pawl and then the handle is turned to move the teeth of the stem to the position where the teeth is not engaged with the nonreturn pawl and then the stem is pulled by the tension of the brake cable, the brake cable is slackened and the brake is released. In the last step for releasing brake, the stem is turned reversely again to the position on a side line on which the nonreturn pawl is positioned by a guide mechanism comprising a pin fixed to the stem and the guide tube with a slot and so on.

In such general cane type emergency brake, however, if driver's knee hits against the handle of the stem and the handle is turned, said nonreturn pawl may be disengaged from said teeth. To prevent such trouble, cane type emergency brakes that are released by two-steps operations are disclosed in Japanese Utility Model Laying Open No. Showa 4 (1988)-24074 and Japanese Utility Model Laying Open No. Showa 4 (1988)-24075.

Each of them comprises a handle, mounted turnably to a stem or a plunger, which can turn freely, a return mechanism having a circular arc cam for returning said idled handle to initial position in relation to said stem and an elastic body and a free turn stopper having a slide key which stops free turning of said handle so that the stem can be twisted by operation of the handle. Thus the handle turns freely without contacting to the stem so long as the free turn stopper is not operated even if external force is applied to the handle; therefore, there is no possibility of careless release of the brake.

In the above-mentioned prior art, however, the direction of the force of the return mechanism seeking to return the handle to the initial position reverses when the handle is twisted by an angle 90 with respect to the initial position; therefore, a handle twist angle is necessary to be smaller than 90 degrees in each direction of both clockwise and counterclockwise, and so the free turnable angle of the handle is limited within 180 degrees.

Accordingly the applicant of this application proposed a cane type emergency brake, disclosed in Japanese Patent Laying Open No. Heisei 7 (1995)-186912, whose handle can turn freely over 180 degrees and external appearance of the handle is simple.

Figure 8:
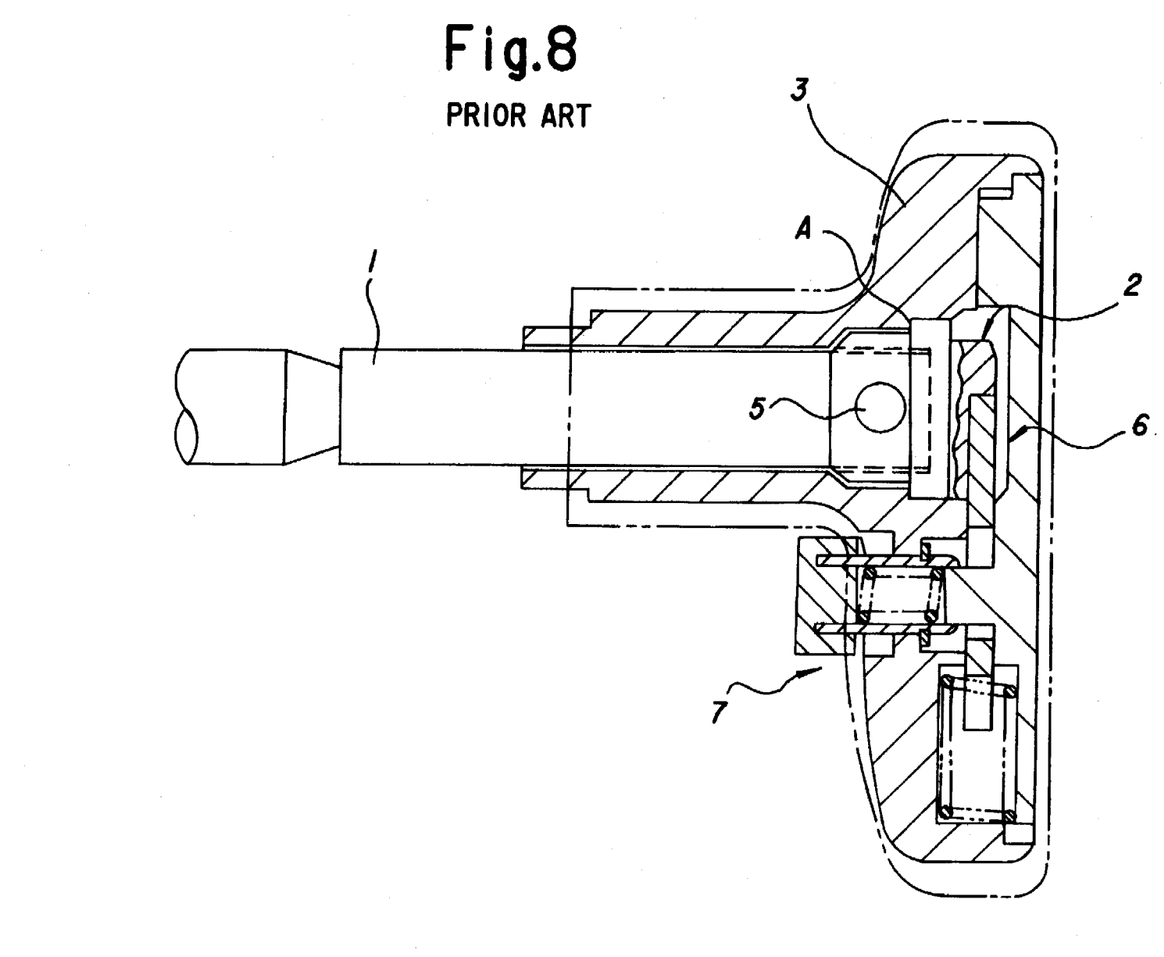
FIG. 8 is a longitudinal sectional view showing a principal portion of the cane type emergency brake of the prior art.

In this cane type emergency brake, as shown in FIG. 8, a columnar member 2 is fixed to the top of the stem 1 by a pin 5 and so on, and a handle 3 is mounted freely turnably by using the columnar member 2; furthermore, the cane type emergency brake is equipped with a return mechanism for returning the handle 3 and a free turn stopper for stopping free turning of the handle 3. When the handle 3 is pulled for the sake of braking, the columnar member 2 is pulled through a contact portion A, and so the stem 1 is pulled; therefore the handle 3 and the contact portion A are rubbed each other even when the handle turns freely.

In said prior art proposed by the present applicant, however, the area of the contact portion A cannot be made large because the columnar member 2 is fixed to the top of the stem 1 by the pin 5 and so on and a handle 3 is mounted freely turnably. Furthermore contacting surfaces of the contact portion A and handle 3 are abraded hard and their durability is low because the material of the handle 3 is aluminum or synthetic resin.

Since various kinds of components are mounted in relation to the columnar member 2, the fixed strength between the columnar member 2 and the stem 1 affects the performance of the brake directly, and so there is the possibility of the occurrence of shake. Furthermore, since the columnar member 2 is necessary to be combined with the stem 1, the number of parts increases and so the matter prevents the manufacturing cost from reducing.

Accordingly, it is an object of the present invention to provide a cane type emergency brake of an automobile whose handle can turn freely over 180 degrees and which is of durable function and can be reduced its manufacturing cost.

SUMMARY OF THE INVENTION

To solve the above-mentioned problems, the present invention has a stem (10) which can move along its axis and can be held in the state pulling a brake cable, a handle (20) which is combined free-rotatably to the top (15) of the stem (10) and a return mechanism (30) which returns free-turned handle (20) to initial position in relation to said stem (10); furthermore, the present invention has a free turn stopper (40) that disables free turning of said handle (20) so that the brake can be released by twist operation of the stem (10) through said handle (20) and the brake cable can be slackened by pushing the stem (10).

Said return mechanism (30) consists of a cam plate (31) and a cam (33).

Said cam plate (31) is located movably within said handle (20) so that it can slide in an orthogonal direction with respect to the axis of said stem (10) and is pressed to the periphery of the cam (33) mounted on the top (15) of said stem (10).

The cam (33) is formed monolithically on the enlarged top (15) of said stem (10), and the top surface of said cam plate (31) is in contact with the periphery of said cam (33) slidably; therefore, said cam plate (31) is slided against the force that presses the cam plate (31) to the periphery of the cam (33) when said handle (20) is twisted from said initial position in relation to said stem (10).

When said handle (20) is in said initial position, the contact position where said cam (33) and said cam plate (31) are contacted with each other is shifted from the center line of said stem (10) to the direction of said force.

Said handle (20) is engaged with the enlarged top (15) of said stem (10) through the contact portion so that said handle (20) can pull the stem (10) when the handle (20) is pulled to brake. A sleeve is fixed to the contact portion.

Said cane type emergency brake of the present invention operates as described hereinafter.

The stem (10) is movable along its axial direction. When the stem (10) is pulled, the brake cable is pulled and so the brake is put on. Then, if the stem (10) is returned, the brake cable is slackened, and so the brake is released. If the stem (10) is pulled, for example in parking, it is held its state with braking. The top (15) of the stem (10) is pulled through the contact portion of the handle (20). Since the sleeve is fixed to the contact portion, the contact portion is hardly weared but only the sleeve is rubbed when the brake is put on or the handle turns relatively to the stem slightly.

Figure 5:
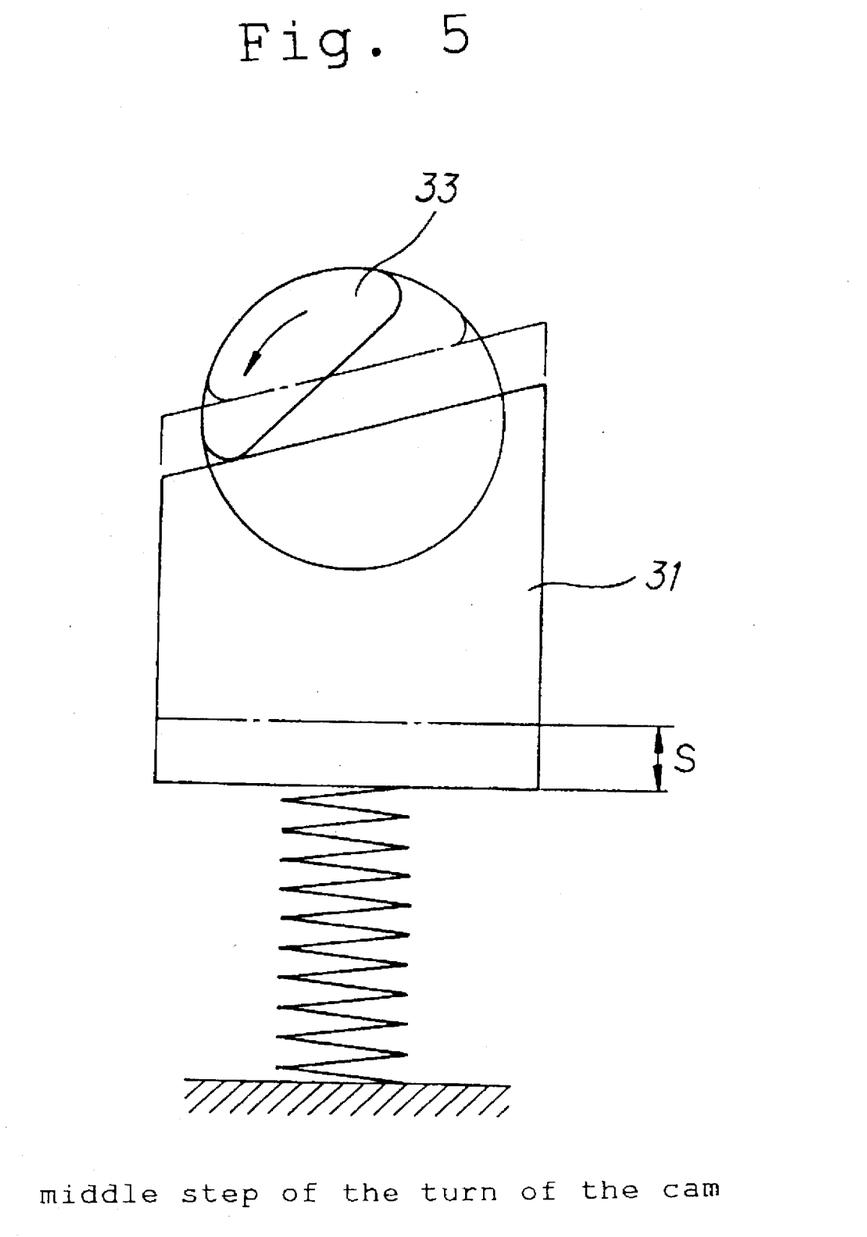
FIG. 5 is a schematic representation for explaining the operation of the return mechanism of the cane type emergency brake according to the present invention.

If the handle (20) is pushed and turned freely from the initial position (twisted with respect to the stem (10)) by external force, for example hitting a part of man's body, the handle (20) turns freely against the force by the return mechanism (30). Thus, as shown in FIG. 5, the cam plate (31) turns relatively to the cam (33) mounted on the top (15) of said stem (10) and slides within the handle (20) against the force by a spring (32), and so the handle (20) turns freely and there is no possibility of the careless release of the brake.

Since the cam (33) is formed monolithically on the top (15) of said stem (10), relative position between the cam (33) and the cam plate (31) is stable and there is no possibility of the occurrence of shake, and furthermore the favorable state is kept long. Even if the handle (20) turns relatively to the stem (10) and they are rubbed each other, the contact portion is hardly rubbed but only the sleeve is rubbed.

If said external force is relieved, the handle (20) returns to the initial position with free turning because the cam plate (31) tends to be returned to the contacting state with respect to the cam (33) by the force of the spring (32), so long as the torque which is generated between the stem (10) and the cam plate (31) in the handle (20) side by the force of the spring (32) is not reversed its direction.

Figure 2:
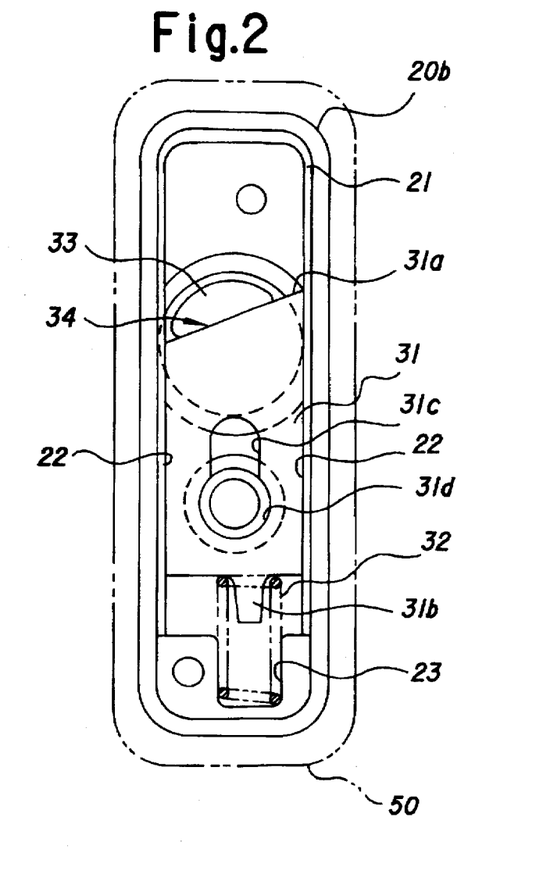
FIG. 2 is a front view showing the cane type emergency brake whose handle cover is removed.
Figure 4:
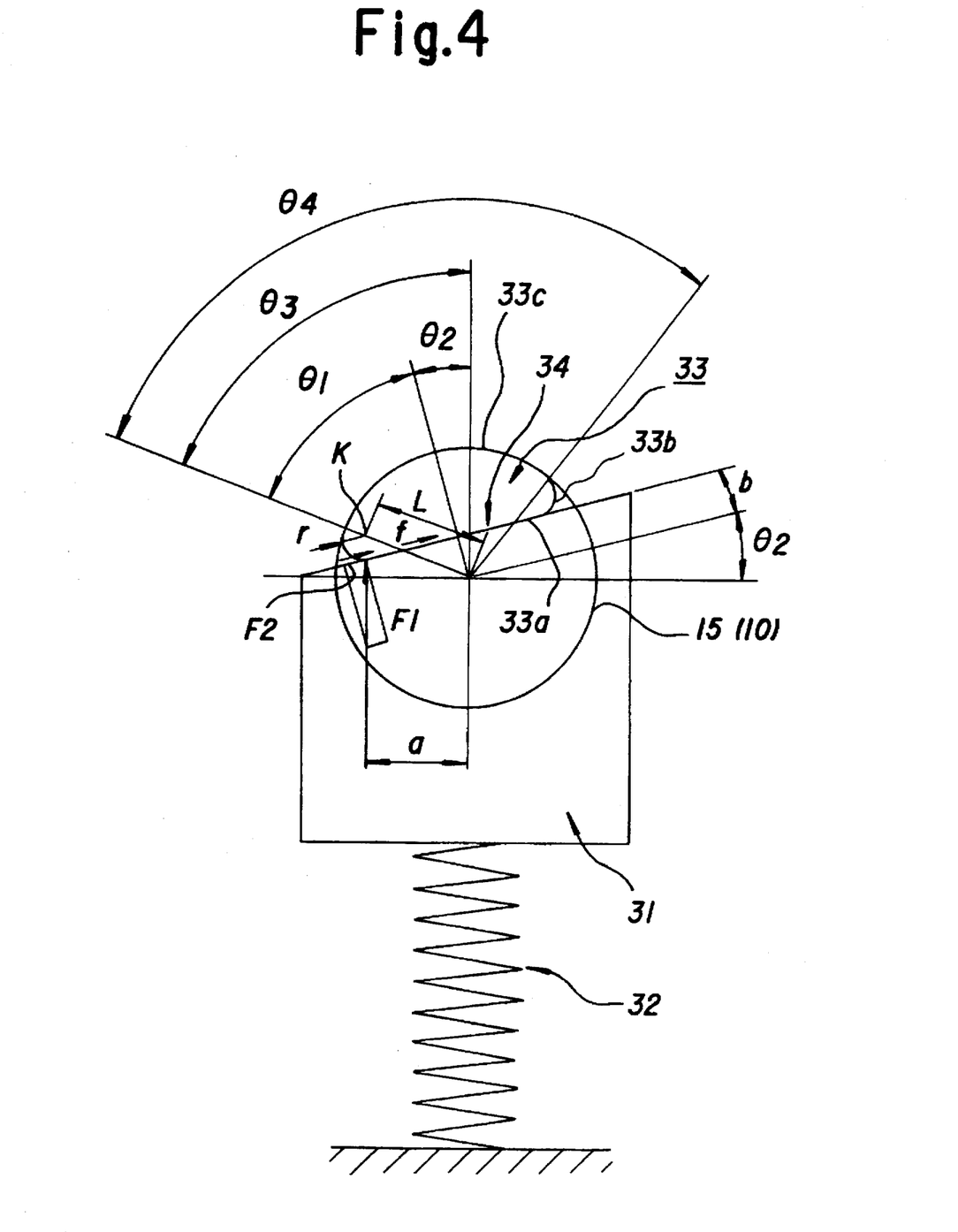
FIG. 4 is a schematic representation for explaining a return mechanism of the cane type emergency brake according to the present invention.

In the initial state as shown in FIGS. 2 and 4, since the contact position where said cam (33) and cam plate (31) are contacted with each other is shifted by the distance "b" from the center line of said stem (10) to the direction of said force of the spring (32), the direction of said torque can be reversed by over 90 degrees, and so the handle (20) can turn freely over 180 degrees.

If a driver wants to release the brake, he needs only to turn the handle (20) with operating the free turn stopper (40); that is, if he grips the handle (20) and pushes a button (41) into the handle (20), the top portion of the button (41) moves into an engaging hole (31d) of said cam plate (31) and engages with the engaging hole (31d) against the force of the coil spring (42).

Then, the cam plate (31) within the handle (20) is impossible to move, and so the cam plate (31) turns together with the cam 33 mounted on the top (15) of the stem (10) and the handle (20) does not turn freely. Since the stem (10) is twisted by turning operation of the handle (20), the stem (10) which is held in braking state is released, and then the brake cable is slackened and the brake is released if the stem (10) is pushed along its axial direction.

In the state that the stem (10) is pushed and the brake is released, the brake is put on if the driver pulls the stem (10) with gripping the handle (20); that is, the top (15) of the stem (10) is pulled through the sleeve fixed to the contact portion of the handle (20) when the handle (20) is pulled, and then if the handle (20) is released in proper position, the stem (10) is impossible to rotate, and so it is held in the position and state by engaging the teeth of the stem with the nonreturn pawl.

DETAILED DESCRIPTION

One of the embodiments of the present invention will be now described in detail with reference to drawings, FIGS. 1–5.

Figure 1:
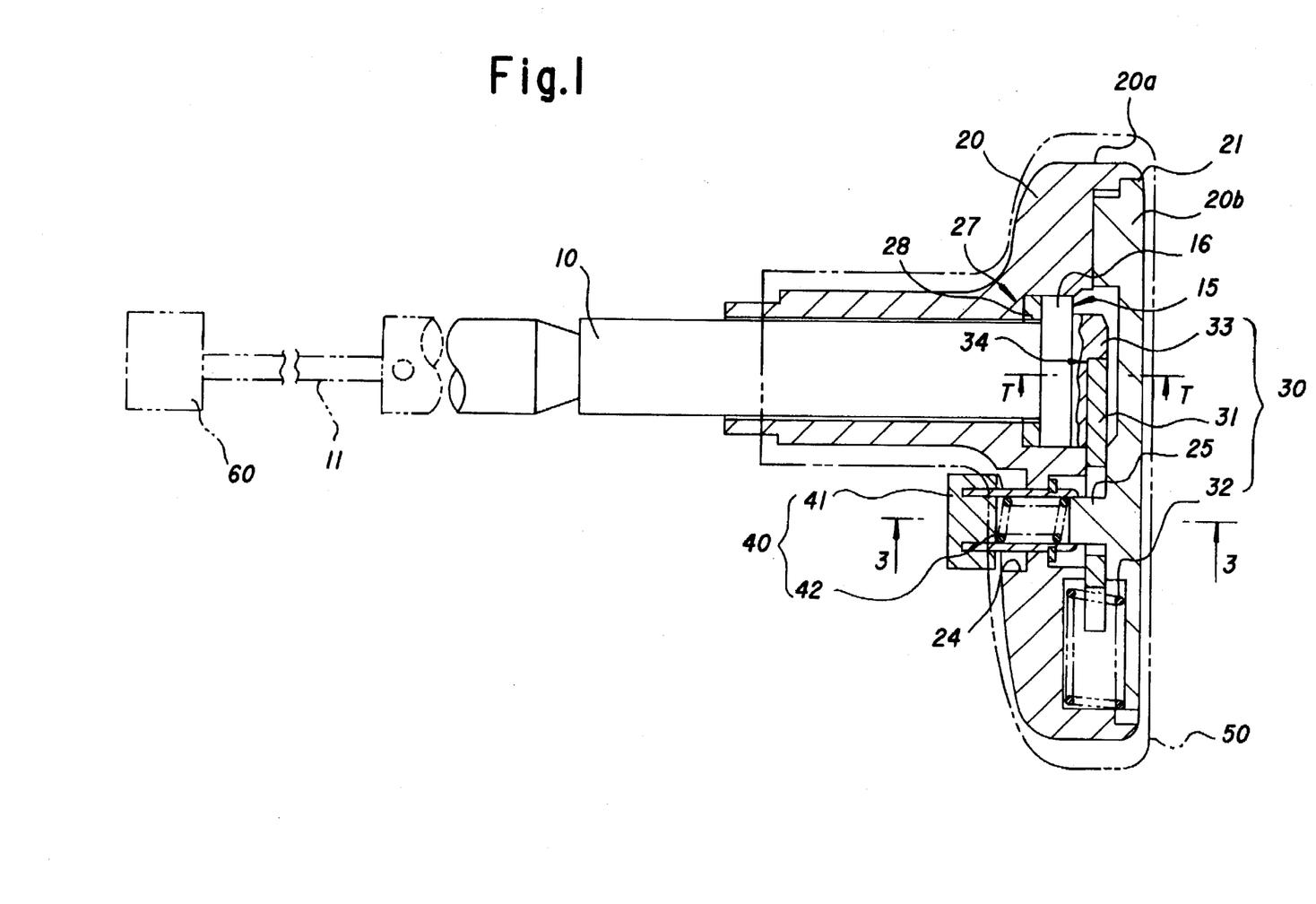
FIG. 1 is a longitudinal sectional view showing a principal portion of the cane type emergency brake according to the present invention (see also, FIGS. 1A and 1B).

As shown in FIG. 1, there is a cane type emergency brake according to the present invention including a stem 10 for pulling a brake cable 11, a handle 20 which is combined to twist freely (free-rotatably) to the top 15 of the stem 10, a return mechanism 30 for returning the free-turned handle 20 to initial position in relation to said stem 10 and a free turn stopper 40 which disables said handle 20 to turn freely so that the stem 10 can be twisted through the handle 20 (see also, FIGS. 1A and 1B).

The stem 10 is supported movably in rectilineal so that it can pull a brake cable in a guide tube (not shown), and the stem 10 is held in a given position with pulling the brake cable by the engagement of teeth formed on a part of the stem surface and a nonreturn pawl formed on the inside of the guide tube. Although the top 15 of the stem 10 is shown in FIG. 1, the portion where said teeth is formed and the other end of the stem 10 are not shown because they are well known.

Generally the stem 10 is made of steel, and the columnar top 15 enlarged from a rod portion extending downwards is formed at the upper end. The overhang 16 of the top 15 serves as a catching portion for handle 20.

The handle 20 comprises a grip 20a which is bored a hole for inserting the stem 10 and a handle cover 20b which is fastened to a grip side of the grip 20a by screws. The base portion 26 of the grip 20a is combined with the stem 10 so that it can move and turn freely around the periphery of the top 15 of the stem 10, and so the handle 20 can be turned freely.

Figure 3:
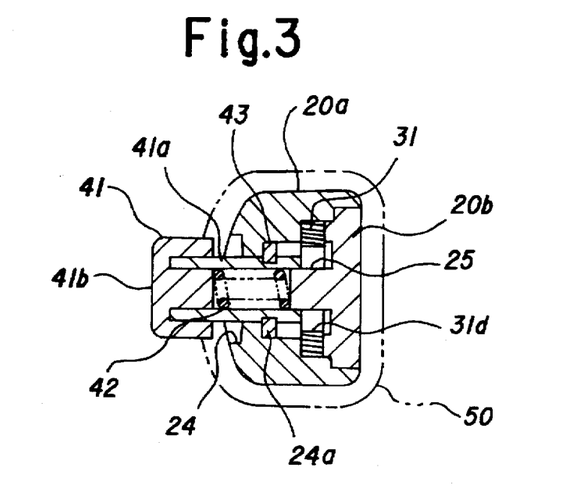
FIG. 3 is a sectional view taken substantially along the lines 3—3 of FIG. 1.

A contact portion 27 is formed inside the handle 20 so that the handle 20 can be engaged with the overhang 16 of the enlarged top 15 of the stem 10 and can pull the stem 10 when it is pulled to brake. The handle 20 is made of aluminum and is covered by plastic 50 as shown in FIGS. 1–3 by a chain line, or the handle 20 is made of only plastic. An abrasion-resistant sleeve 28 is fixed to the contact portion 27 so that the contact portion 27 cannot be rubbed by the overhang 16.

The overall configuration of the grip 20a is rectangular, as shown in FIG. 2, and an opening is bored in the top side of the grip 20a. A ridge 21 for mounting the handle cover 20b is formed around the opening; furthermore, two opposed parallel inner faces 22 are formed in both longitudinal sides of the ridge 21. A concave portion 23 in which the low-end portion of a spring 32, which is described hereinafter, is mounted is formed in the lower portion of the inside of the grip 20a. A penetration hole 24 where the top of the push button 41 described hereinafter is inserted is formed under the hole for inserting the stem 10.

A columnar projection 25 extending to the penetration hole 24 is formed on the handle cover 20b. The outside diameter of the columnar projection 25 is smaller than the inside diameter of the cylindrical portion 41a of the push button 41 so that the cylindrical portion 41a can slide around the columnar projection 25.

The return mechanism 30 comprises a cam plate 31 which is fitted between said inner faces 22 and can move normal to the axial direction of the stem 10, a coil spring 32 as a forcing means which forces the cam plate 31 towards the center of the top 15 of the stem 10 and a cam 33 which is formed on the top 15 of the stem 10 and is in contact with the end of the cam plate 31. The cam plate 31, as shown in FIGS. 2 and 4, is a rectangular plate which has the end face 31a inclined at an angle θ2, and a projection 31b which is inserted into one end of the coil spring 32 is formed at the base end portion of the cam plate 31. In a middle portion of the cam plate 31, a hole 31c, which is penetrated by the columnar projection 25, is formed; furthermore, an engaging hole 31d which engages with the top portion of the cylindrical portion 41a of the push button 41 described hereinafter engages is formed.

The diameter of the engaging hole 31d is larger than the width of the hole 31c. The engaging hole 31d is formed at the position where the top portion of the cylindrical portion 41a of the push button 41 engages with it when the cam plate 31 is in an initial position. The hole 31c has the length which enables the columnar projection 25 to move over all sliding operation of the cam plate 31.

The initial position of the cam plate 31 means the sliding position of the cam plate 31 in the state that the plane portion 33a of the cam 33 described hereinafter contacts with the end face 31a of the cam plate 31 in parallel. The initial position of the handle 20 means the twisted position of the handle 20 with respect to the stem 10 in said state.

The cam 33 is formed monolithically on the top 15 of said stem 10, as shown in FIG. 4, and comprises the plane portion 33a, a small diameter circular arc portion 33b and a large diameter circular arc portion 33c.

The plane portion 33a is shifted by the distance "b" from the center line of said stem 10. The large diameter circular arc portion 33c is a circular arc whose center is on the center line of said stem 10 and the small diameter circular arc portion 33b is a circular arc whose radius is "r" and its center is in a point shifted by the distance "L" from the center line of said stem 10 at an angle θ1 (hereinafter referred to as cam reference point K). The small diameter circular arc portion 33b continues the plane portion 33a smoothly to the large diameter circular arc portion 33c. The angle θ1 is the angle with respect to a reference line which crosses to the center line of said stem 10 and crosses at a right angle with respect to the plane portion 33a. The cam 33 is symmetric about this reference line.

The free turn stopper 40, as shown in FIG. 3, comprises the push button 41 which is mounted slidably in the penetration hole 24 bored of the handle cover 20b and holds the cam plate 31 in the initial position by engaging its top end with the inside of the engaging hole 31d of the cam plate 31 and a return coil spring 42 for returning the push button 41 to the position (release position) where the top of the push button 41 is away from the cam plate 31.

The push button 41 comprises the cylindrical portion 41a which is inserted into the penetration hole 24 and a push portion 41b which is mounted on the base end of the cylindrical portion 41a and projects out to the front side of the handle 20. The push button 41 is held in the release position by a retaining ring 43 fixed to the ridge inside the penetration hole 24. In mounting the push button 41 into the penetration hole 24, the columnar projection 25 is enlarged when the push button 41 is pushed into the penetration hole 24 and the top portion of the cylindrical portion 41a is inserted by the columnar projection 25 of the handle cover 20b, and that the retaining ring 43 is fitted in the periphery of the columnar projection 25.

The return coil spring 42 is placed in the cylindrical portion 41a before the push button 41 is pushed into the penetration hole 24. When the push button 41 is mounted, the return coil spring 42 is compressed between the inner surface of the push portion 41b and the top portion of the columnar projection 25.

Whole handle 20 is covered by resin except the push portion 41b of the push button 41, and the push button 41 can be mounted after covering.

The summary of the operation of the embodiment will be explained next.

When the stem 10 is pulled, the brake cable is pulled and so the brake is put on. Then, if the stem 10 is returned, the brake cable can be slackened and so the brake is released. If the stem 10 is pulled, for example in parking, it is held its state with braking by engagement of said teeth and nonreturn pawl. The top 15 of the stem 10 is pulled through the contact portion 27 of the handle 20. Since the sleeve 28 is fixed to the contact portion 27, the contact portion 27 is hardly rubbed but only the sleeve 28 is rubbed when the brake is put on or the handle 20 turns relatively to the stem 10 slightly.

If the handle 20 is pushed and twisted with respect to the stem 10 from the initial position by external force, the cam 33 mounted on the top 15 of said stem 10, as shown in FIG. 5, turns relatively to the cam plate 31 and slides the cam plate 31 mounted slidably in the handle 20 against the force by the spring 32. Therefore, if said external force is relieved, the handle 20 returns to the initial position with free turning because the cam plate 31 tends to be returned to contacting state with respect to the cam 33 by the force of the spring 32, so long as the torque that is generated between the stem 10 and the cam plate 31 in the handle 20 by the force of the spring 32 is not reversed its direction.

In the initial state as shown in FIGS. 2 and 4, since the contact position where said cam 33 and said cam plate 31 are contacted with each other is shifted by the distance "b" from the center line of said stem 10 to the direction of said urging force, the direction of said torque can be reversed by over 90 degrees, and so the handle 20 can turn freely over 180 degrees.

Since the cam 33 is formed monolithically on the top 15 of said stem 10, relative position between the cam 33 and the cam plate 31 is stable and there is no possibility of the occurrence of shake, and furthermore the favorable state is kept long. Even if the handle turns relatively to the stem and they are rubbed each other, the contact portion is hardly rubbed but only the sleeve is rubbed.

Thus, even if external force is applied to the handle 20, there is no possibility of careless release of the brake because of free turning of the handle 20. If the free turning angle is within a given angle such as 220 degrees, the handle 20 returns to the initial position automatically; therefore, there is no need for a driver to return the handle 20.

If the driver wants to release the brake, he needs only to turn the handle 20 with operating the free turn stopper 40; that is, if he grips the handle 20 and pushes a button 41 into the handle 20, the top portion of the button 41 moves into an engaging hole 31d of said cam plate 31 and engages with the engaging hole 31d against the force of the coil spring 42.

Then, the cam plate 31 within the handle 20 is impossible to move, and so the cam plate 31 turns together with the cam 33 mounted on the top 15 of the stem 10 and the handle 20 does not turn freely. Since the stem 10 is twisted by turning operation of the handle 20, the stem 10 which is held in braking state is released, and then the brake cable is slackened and the brake is released if the stem 10 is pushed along its axial direction.

In the state that the stem 10 is pushed and the brake is released, the brake is put on if the driver pulls the stem 10 with gripping the handle 20; that is, the top 15 of the stem 10 is pulled through the sleeve 28 fixed to the contact portion of the handle 20 when the handle 20 is pulled, and then if the handle 20 is released in proper position, the stem 10 is impossible to rotate and so it is held in the position and state by engaging the teeth of the stem with the nonreturn pawl.

Figure 6:
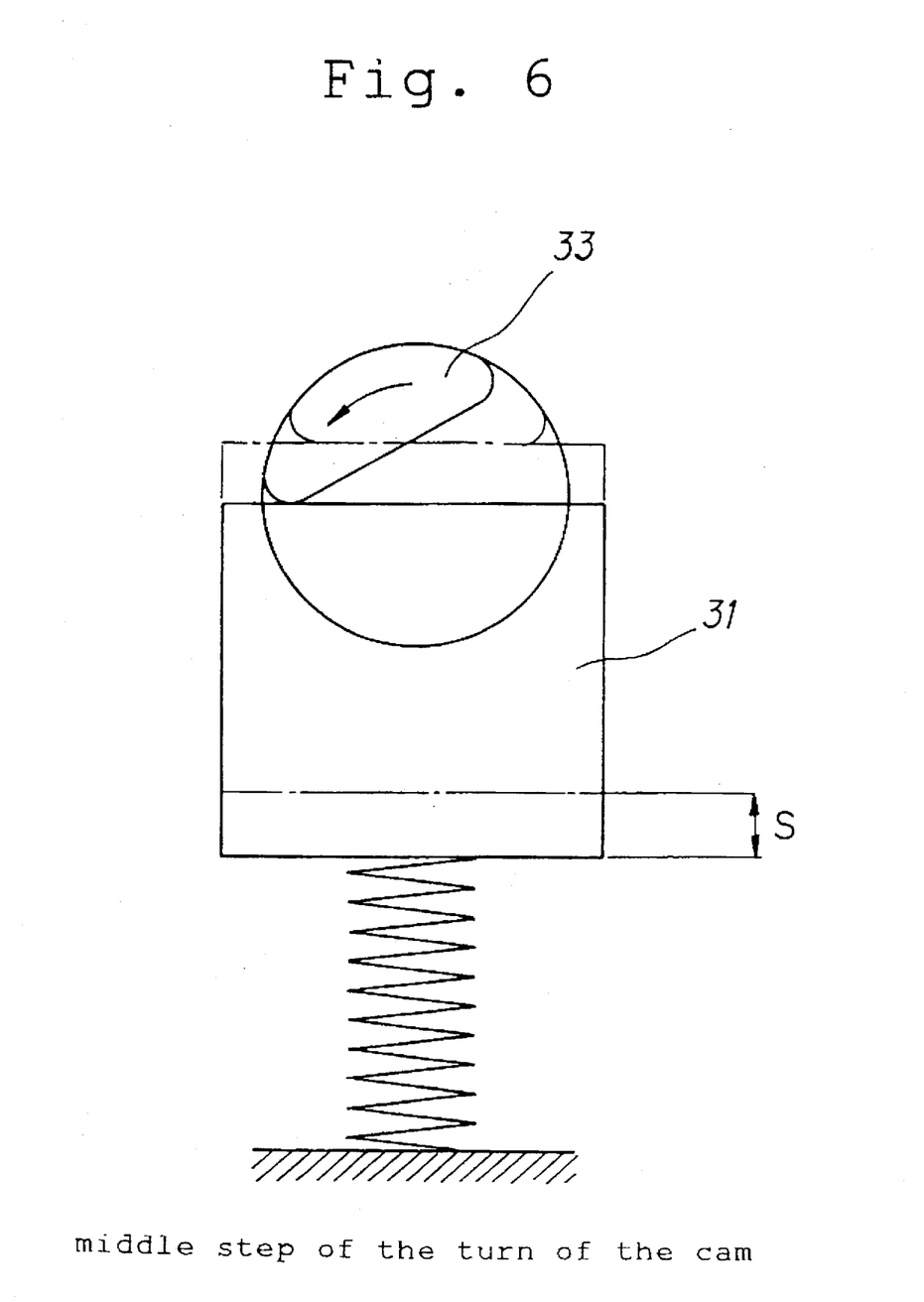
FIG. 6 is a schematic representation for explaining a modified form of the return mechanism of the cane type emergency brake according to the present invention.
Figure 7:
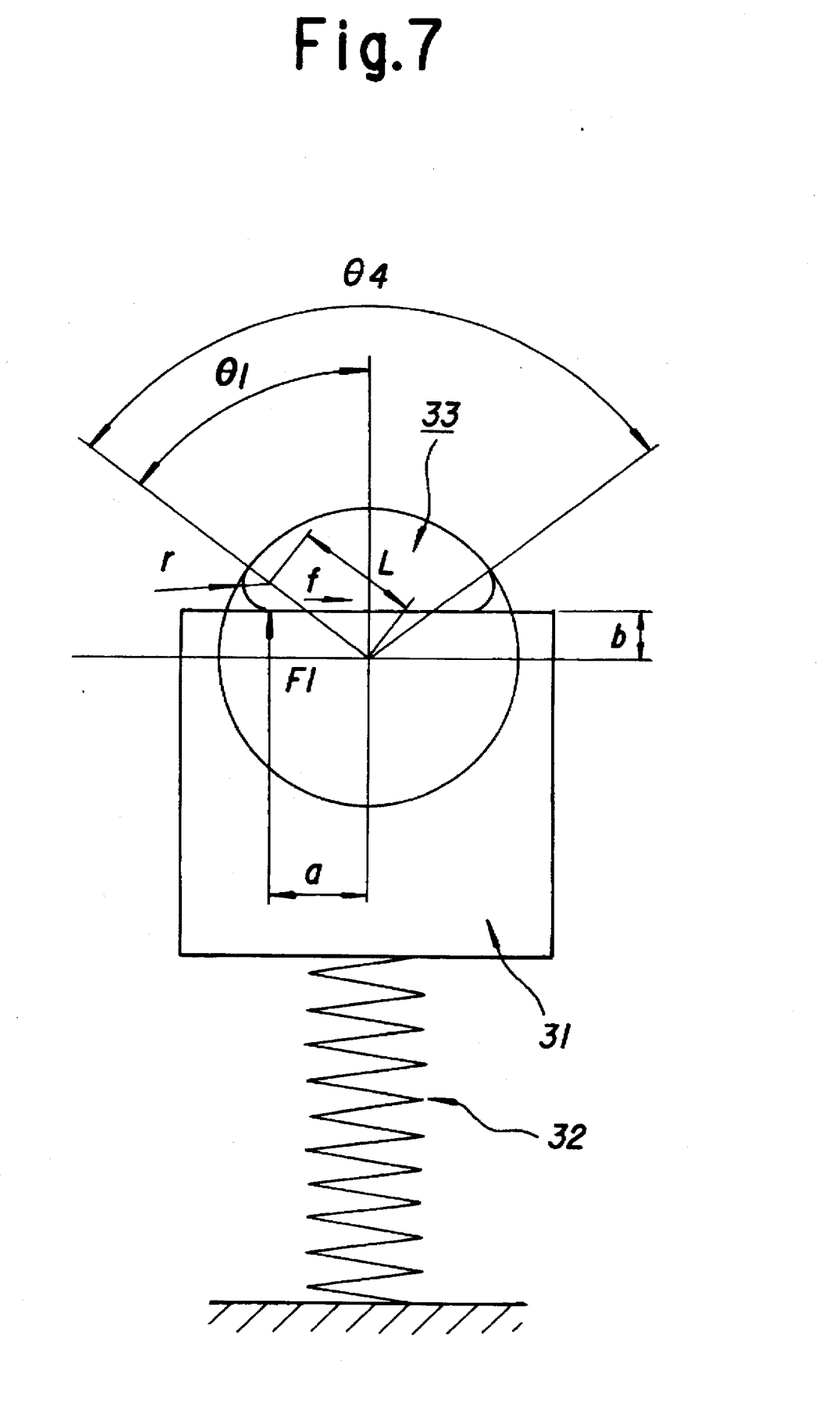
FIG. 7 is a schematic representation for explaining the operation of the modified form of the return mechanism of the cane type emergency brake according to the present invention.

FIGS. 6 and 7 show another embodiment of the present invention. The end face of the cam plate 31 is a plane directed orthogonally to the sliding direction of the cam plate 31. In this case, the handle 20 can turn freely in a wide angle and can return automatically. The slant of the end face of the cam plate 31 is available for stabilizing a hundle turning position in the initial position.

While the invention has been particularly shown and described in reference to preferred embodiments thereof, it will be understood by those skilled in the art that changes in form and details may be made therein without departing from the spirit and scope of the invention.

What is claimed is:

1. A cane type emergency brake, comprising:

a stem which moves along an axial direction thereof and pulls a brake cable;

a handle coupled to a portion of the stem;

a return mechanism for returning the handle to an initial position in relation to the stem; and a stopper for disabling said handle, wherein a brake is releasable by twisting said stem through the handle and the brake cable is slackened by pushing the stem, wherein said return mechanism consists of a cam plate and a cam, wherein said cam plate is moved inside said handle so that said cam plate can slide in an orthogonal direction with respect to said axial direction of said stem and is pressed to the periphery of the cam mounted on a top portion of said stem, wherein said cam is monolithically formed on an enlarged top portion of said stem, and the top surface of said cam plate is in slidable contact with the periphery of said cam to thereby have said cam plate slide against the force that presses the cam plate to the periphery of the cam when said handle is twisted from an initial position in relation to said stem, wherein a contact position where said cam and said cam plate are contacted with each other is shifted from a center line of said stem along the direction of a force when said handle is in said initial position, and wherein said handle is engaged with the enlarged top portion of said stem through the contact portion, wherein the handle cap pulls the stem when the handle is pulled for braking, and wherein a sleeve is fixed to the contact portion.

* * * * *